(12) United States Patent
Bilski

(10) Patent No.: US 8,171,774 B2
(45) Date of Patent: May 8, 2012

(54) HYDROCARBON LIQUID-SEAL DEVICE AND A HYDROCARBON VAPOR TESTING SYSTEM HAVING THE HYDROCARBON LIQUID-SEAL DEVICE

(75) Inventor: Gerard W. Bilski, Perrysburg, OH (US)

(73) Assignee: FRAM Group IP LLC, Lake Forest, IL (US)

( * ) Notice: Subject to any disclaimer, the term of this patent is extended or adjusted under 35 U.S.C. 154(b) by 688 days.

(21) Appl. No.: 12/265,806

(22) Filed: Nov. 6, 2008

(65) Prior Publication Data

US 2009/0113989 A1    May 7, 2009

Related U.S. Application Data

(60) Provisional application No. 60/985,852, filed on Nov. 6, 2007.

(51) Int. Cl.
  *G01N 7/00*    (2006.01)

(52) U.S. Cl. .................................................... 73/29.01
(58) Field of Classification Search ................. 73/29.01
  See application file for complete search history.

(56) References Cited

U.S. PATENT DOCUMENTS 3,799,525 A * 3/1974 Dortenzo ...................... 266/158

* cited by examiner

*Primary Examiner* — Hezron E Williams
*Assistant Examiner* — Tamiko Bellamy
(74) *Attorney, Agent, or Firm* — Cantor Colburn LLP

(57) ABSTRACT

A hydrocarbon liquid-seal device is provided. The device includes first and second conduits in fluid communication with each other such that the first and second conduits define a flow path therethrough configured to pass a hydrocarbon vapor. The first and second conduits are in a spaced relationship and are not rigidly coupled to one another for isolating a vibration or movement respectively therein. The device further includes a liquid disposed within a space between first and second end portions of the first and second conduits, respectively, such that the liquid blocks the space between the first and second end portions and seals the hydrocarbon vapor in the flow path.

19 Claims, 1 Drawing Sheet

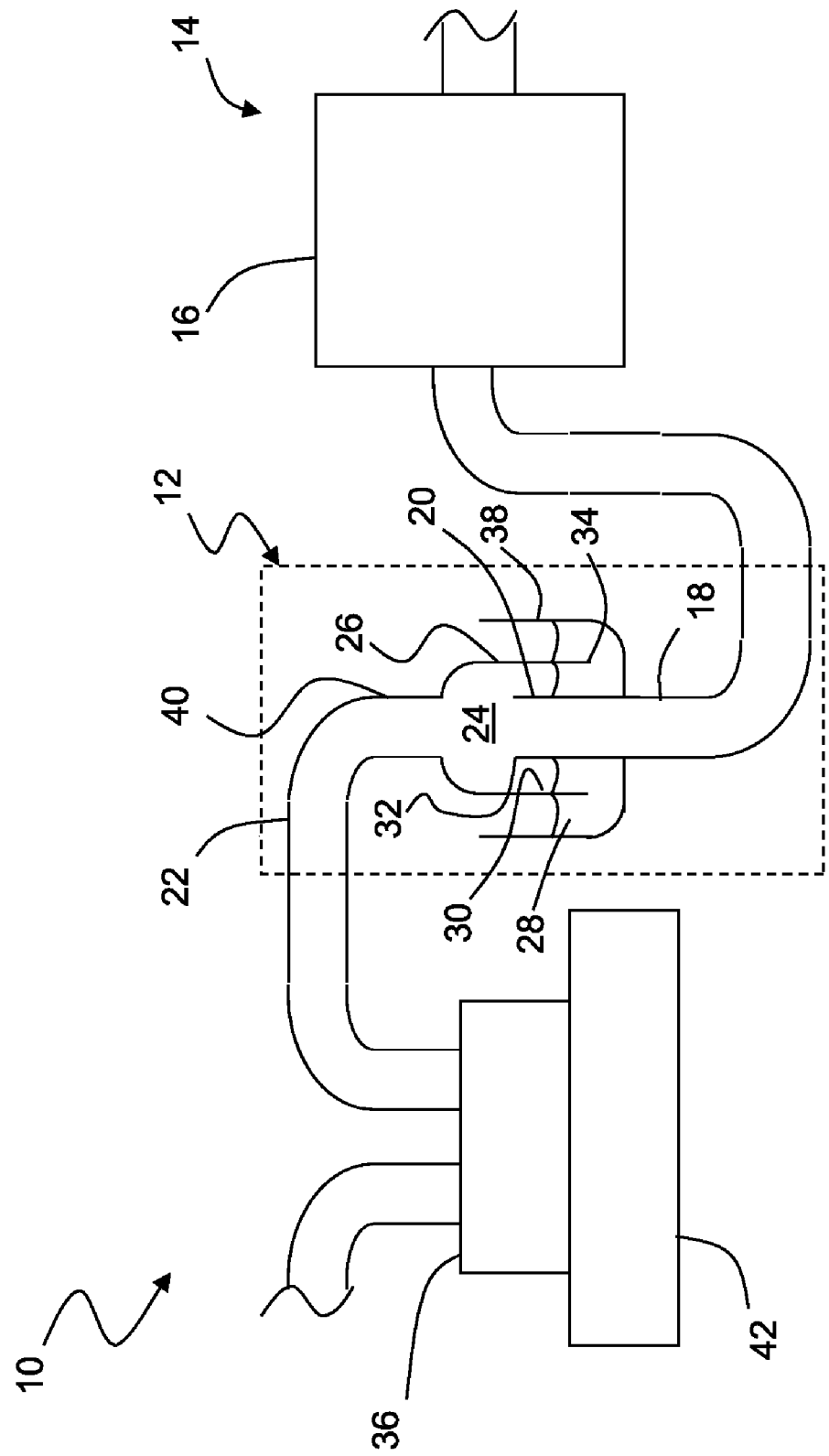

HYDROCARBON LIQUID-SEAL DEVICE AND A HYDROCARBON VAPOR TESTING SYSTEM HAVING THE HYDROCARBON LIQUID-SEAL DEVICE

CROSS REFERENCE TO RELATED APPLICATIONS

This application claims the benefit of U.S. Provisional Patent Application No. 60/985,852 filed Nov. 6, 2007, the contents of which are incorporated herein by reference thereto.

BACKGROUND OF THE INVENTION

Exemplary embodiments of the present invention relate to hydrocarbon vapor testing systems, and more particularly to a hydrocarbon liquid-seal device configured to seal a flow path of a hydrocarbon vapor in the hydrocarbon vapor testing system and isolate vibration to one or more portions of the system.

Hydrocarbon vapor testing systems have an air induction system in fluid communication with a hydrocarbon collector. The air induction system is configured to pass hydrocarbon vapor through two or more conduits, such as flexible tubes, and into the hydrocarbon collector. The hydrocarbon collector is configured to collect hydrocarbon therein. The hydrocarbon vapor testing system further includes a high-precision scale device operably coupled to the hydrocarbon collector. The scale device is configured to precisely measure fractional milligrams of the hydrocarbon in the collector. However, vibrations or slight connection movements can propagate through the system to the scale device and adversely affect the ability of the scale device to precisely measure the mass of hydrocarbon.

Accordingly, it is desirable to provide a device configured to seal a flow path in a hydrocarbon vapor testing system and isolate vibrations to one or more portions of the system for enhancing analysis of the hydrocarbon vapor.

BRIEF DESCRIPTION OF THE INVENTION

In a non-limiting exemplary embodiment, a hydrocarbon liquid-seal device is provided. The hydrocarbon liquid-seal device includes a first conduit having a first end portion. The hydrocarbon liquid-seal device further includes a second conduit in fluid communication with the first conduit such that the first conduit and the second conduit define a flow path configured to pass a hydrocarbon vapor therethrough. The second conduit has a second end portion. The first end portion and the second end portion are in a spaced relationship with respect to each other and are not rigidly coupled to each other for isolating a vibration or other movement respectively thereto. The hydrocarbon liquid-seal device further includes a liquid disposed within a space between the first end portion and the second end portion such that the liquid blocks the space between the first end portion and the second end portion for sealing the hydrocarbon vapor in the flow path.

A hydrocarbon vapor testing system in accordance with another non-limiting embodiment of the present invention is provided. The hydrocarbon vapor testing system includes a test cell device configured to evaluate a hydrocarbon absorber device. The hydrocarbon vapor testing system further includes a hydrocarbon liquid-seal device having a first conduit in fluid communication with the test cell device. The first conduit has a first end portion. The hydrocarbon liquid-seal device further includes a second conduit in fluid communication with the first conduit such that the first conduit and the second conduit define a flow path configured to pass a hydrocarbon vapor therethrough. The second conduit has a second end portion. The first end portion and the second end portion are in a spaced relationship with respect to each other and are not rigidly coupled to each other for isolating a vibration or other movement respectively thereto. The hydrocarbon liquid-seal device further includes a liquid disposed within a space between the first end portion and the second end portion such that the liquid blocks the space between the first end portion and the second end portion for sealing the hydrocarbon vapor in the flow path. The hydrocarbon vapor testing system further includes a hydrocarbon vapor collecting device in fluid communication with the second conduit. The hydrocarbon vapor collecting device is configured to receive the hydrocarbon vapor from the second conduit.

BRIEF DESCRIPTION OF THE DRAWING

The FIGURE is a schematic of a hydrocarbon vapor testing system having a hydrocarbon liquid-seal device, in accordance with a non-limiting exemplary embodiment of the present invention.

DETAILED DESCRIPTION OF EXEMPLARY EMBODIMENTS

Exemplary embodiments of the present invention are directed to a hydrocarbon vapor testing system having a hydrocarbon liquid-seal device configured to seal a flow path of hydrocarbon vapor in the system and isolate a vibration to one or more portions of the system. In accordance with one non-limiting exemplary embodiment, the hydrocarbon liquid-seal device described herein is a component of a hydrocarbon vapor testing system configured to evaluate a hydrocarbon removal device. However, it is contemplated that the hydrocarbon liquid-seal device can instead be a component of other suitable systems configured to analyze various gases.

Referring to the FIGURE, there is shown a hydrocarbon vapor testing system 10 having a hydrocarbon liquid-seal device 12 (hereinafter "liquid-seal device"), according to a non-limiting exemplary embodiment of the present invention.

The hydrocarbon vapor testing system includes an air induction system 14 including a hydrocarbon removal device and a test cell device 16 configured to evaluate the hydrocarbon absorber device.

The hydrocarbon vapor testing system further includes the liquid-seal device having a first conduit 18 in fluid communication with the test cell device. The first conduit has a first end portion 20. The liquid-seal device further includes a second conduit 22 in fluid communication with the first conduit such that the first conduit and the second conduit define a flow path 24 configured to pass the hydrocarbon vapor therethrough. The second conduit has a second end portion 26. The first end portion and the second end portion are in a spaced relationship with respect to each other and are not rigidly coupled to each other for isolating vibrations or other movements respectively thereto.

The liquid-seal device further includes a liquid 28 disposed within a space 30 between the first end portion and the second end portion. The first end portion has a first rim 32 disposed in a spaced relationship with respect to the liquid, and the second end portion has a second rim 34 disposed within the liquid. Accordingly, the liquid blocks the space between the first end portion and the second end portion for sealing the hydrocarbon vapor in the flow path.

The liquid is not comprised of hydrocarbons or other constituents that can be drawn into the flow path of vapor in the first and second conduits. In addition, the liquid is configured not to absorb hydrocarbons from the hydrocarbon vapor that is being routed through the first and second conduits. Accordingly, the liquid does not influence the system's measurement of the vapor.

The first end portion has a first cross-sectional size, and the second end portion has a second cross-sectional size that is greater than the first cross-sectional size. The second end portion is disposed concentrically about the first end portion and configured to receive the first end portion therein.

The liquid-seal device further includes a cup portion 38 having a third cross-sectional size that is greater than the second cross-sectional size of the second end portion. The cup portion is disposed concentrically about the second end portion and configured to contain the liquid in the space between the first end portion and the second end portion.

Also in this non-limiting embodiment, the second conduit further includes a tubular portion 40 having a fourth cross-sectional size that is less than the second cross-sectional size of the second end portion. However, it is contemplated that the fourth cross-sectional size can be greater than or equal to the second cross-sectional size. The tubular portion is in fluid communication between the second end portion and the hydrocarbon vapor collecting device.

The hydrocarbon vapor testing system further includes a hydrocarbon vapor collecting device 36 in fluid communication with the second conduit. The hydrocarbon vapor collecting device is configured to receive the hydrocarbon vapor from the second conduit.

The hydrocarbon vapor testing system further includes a scale device 42 operably coupled to the hydrocarbon vapor collecting device. The scale device is configured to determine a mass of hydrocarbon accumulated from the vapor within the hydrocarbon vapor collecting device.

The hydrocarbon vapor collecting device is in a spaced relationship with respect to the first conduit and the test cell device, such that the hydrocarbon vapor collecting device is not rigidly coupled to the first conduit and the test cell device. Further, the test cell device is in a spaced relationship with respect to the second conduit and the hydrocarbon vapor collecting device, such that the test cell device is not rigidly coupled to the second conduit and the hydrocarbon vapor collecting device. The scale device is in a spaced relationship with respect to the first conduit and the test cell device, such that the scale device is not rigidly coupled to the first conduit and the test cell device. Accordingly, vibrations in the test cell device and the first conduit are isolated thereto away from the scale device, such that the scale device precisely measures fractional milligrams of hydrocarbon from the vapor without its accuracy being adversely affected by vibrations in the test cell device and/or the first conduit.

In one non-limiting embodiment, the liquid has a substantially low viscosity for reducing the amount of vibrations propagated between the first end portion and the second end portion. For instance, the liquid can be a polypropylene glycol or other suitable liquids.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A hydrocarbon liquid-seal device, comprising:
   a first conduit having a first end portion;
   a second conduit in fluid communication with the first conduit such that the first conduit and the second conduit define a flow path configured to pass a hydrocarbon vapor therethrough, the second conduit having a second end portion, the first end portion and the second end portion being in a spaced relationship with respect to each other and not being rigidly coupled to each other for isolating a vibration respectively thereto;
   a liquid disposed within a space between the first end portion and the second end portion such that the liquid blocks the space between the first end portion and the second end portion for sealing the hydrocarbon vapor in the flow path; and
   a cup portion disposed concentrically about the second end portion.

2. The hydrocarbon liquid-seal device as in claim 1, wherein the first end portion has a first cross-sectional size, and the second end portion has a second cross-sectional size, the second cross-sectional size being greater than the first cross-sectional size, and the second end portion being configured to receive the first end portion therein.

3. A hydrocarbon liquid-seal device, comprising:
   a first conduit having a first end portion;
   a second conduit in fluid communication with the first conduit such that the first conduit and the second conduit define a flow path configured to pass a hydrocarbon vapor therethrough, the second conduit having a second end portion, the first end portion and the second end portion being in a spaced relationship with respect to each other and not being rigidly coupled to each other for isolating a vibration respectively thereto, wherein the first end portion has a first cross-sectional size, and the second end portion has a second cross-sectional size, the second cross-sectional size being greater than the first cross-sectional size, and the second end portion being configured to receive the first end portion therein;
   a liquid disposed within a space between the first end portion and the second end portion such that the liquid blocks the space between the first end portion and the second end portion for sealing the hydrocarbon vapor in the flow path; and,
   a cup portion disposed about the second end portion, the cup portion being configured to contain the liquid in the space between the first end portion and the second end portion.

4. The hydrocarbon liquid-seal device as in claim 2, wherein the cup portion has a third cross-sectional size, the third cross-sectional size being greater than the second cross-sectional size, the cup portion being configured to receive the second end portion therein, and the cup portion being disposed in a spaced relationship with respect to the second end portion.

5. The hydrocarbon liquid-seal device as in claim 2, wherein the second conduit further comprises a tubular portion in fluid communication with the second end portion, the tubular portion having a fourth cross-sectional size, and the fourth cross-sectional size being less than the second cross-sectional size.

6. The hydrocarbon liquid-seal device as in claim 1, wherein the first end portion has a first rim, the first rim being in a spaced relationship with respect to the liquid.

7. The hydrocarbon liquid-seal device as in claim 1, wherein the second end portion has a second rim, the second rim being disposed within the liquid.

8. The hydrocarbon liquid-seal device as in claim 1, wherein the second end portion is disposed concentrically about the first end portion.

9. A hydrocarbon vapor testing system, comprising:
a test cell device configured to route a hydrocarbon vapor and evaluate a hydrocarbon absorber device;
a hydrocarbon liquid-seal device having a first conduit in fluid communication with the test cell device, the first conduit having a first end portion, the hydrocarbon liquid-seal device further including a second conduit in fluid communication with the first conduit such that the first conduit and the second conduit define a flow path configured to pass the hydrocarbon vapor from the test cell device therethrough, the second conduit having a second end portion, the first end portion and the second end portion being in a spaced relationship with respect to each other and not being rigidly coupled to each other for isolating a movement respectively thereto, the hydrocarbon liquid-seal device further having a liquid disposed within a space between the first end portion and the second end portion such that the liquid blocks the space between the first end portion and the second end portion for sealing the hydrocarbon vapor in the flow path; and
a hydrocarbon vapor collecting device in fluid communication with the second conduit, the hydrocarbon vapor collecting device being configured to receive the hydrocarbon vapor from the second conduit.

10. The hydrocarbon vapor testing system as in claim 9, wherein the hydrocarbon vapor collecting device is in a spaced relationship with respect to the first conduit and the test cell device, such that the hydrocarbon vapor collecting device is not rigidly coupled to the first conduit and the test cell device for isolating the vibration to the first conduit and the test cell device.

11. The hydrocarbon vapor testing system as in claim 9, wherein the test cell device is in a spaced relationship with respect to the second conduit and the hydrocarbon vapor collecting device, such that the test cell device is not rigidly coupled to the second conduit and the hydrocarbon vapor collecting device for isolating the movement to the test cell device.

12. The hydrocarbon vapor testing system as in claim 9, further comprising a scale device operably coupled to the hydrocarbon vapor collecting device, the scale device being configured to determine a mass of at least a portion of the hydrocarbon vapor in the hydrocarbon vapor collecting device.

13. The hydrocarbon vapor testing system as in claim 12, wherein the scale device is in a spaced relationship with respect to the first conduit and the test cell device, such that the scale device is not rigidly coupled to the first conduit and the test cell device for isolating the movement to the first conduit and the test cell device.

14. The hydrocarbon vapor testing system as in claim 9, wherein the first end portion has a first cross-sectional size, and the second end portion has a second cross-sectional size, the second cross-sectional size being greater than the first cross-sectional size, and the second end portion being configured to receive the first end portion therein.

15. The hydrocarbon vapor testing system as in claim 14, further comprising a cup portion disposed about the second end portion, the cup portion being configured to contain the liquid in the space between the first end portion and the second end portion.

16. The hydrocarbon liquid-seal device as in claim 14, further comprising a cup portion having a third cross-sectional size, the third cross-sectional size being greater than the second cross-sectional size, the cup portion being configured to receive the second end portion therein, and the cup portion being disposed in a spaced relationship with respect to the second end portion.

17. The hydrocarbon liquid-seal device as in claim 14, wherein the second conduit further comprises a tubular portion in fluid communication with the second end portion, the tubular portion having a fourth cross-sectional size, the fourth cross-sectional size being less than the second cross-sectional size.

18. The hydrocarbon liquid-seal device as in claim 9, wherein the first end portion has a first rim, the first rim being in a spaced relationship with respect to the liquid.

19. The hydrocarbon liquid-seal device as in claim 9, wherein the second end portion has a second rim, the second rim being disposed within the liquid.

\* \* \* \* \*